Jan. 16, 1962  R. GAGNE  3,016,568
LAMINATED EXTRUDING DIE
Filed July 15, 1959
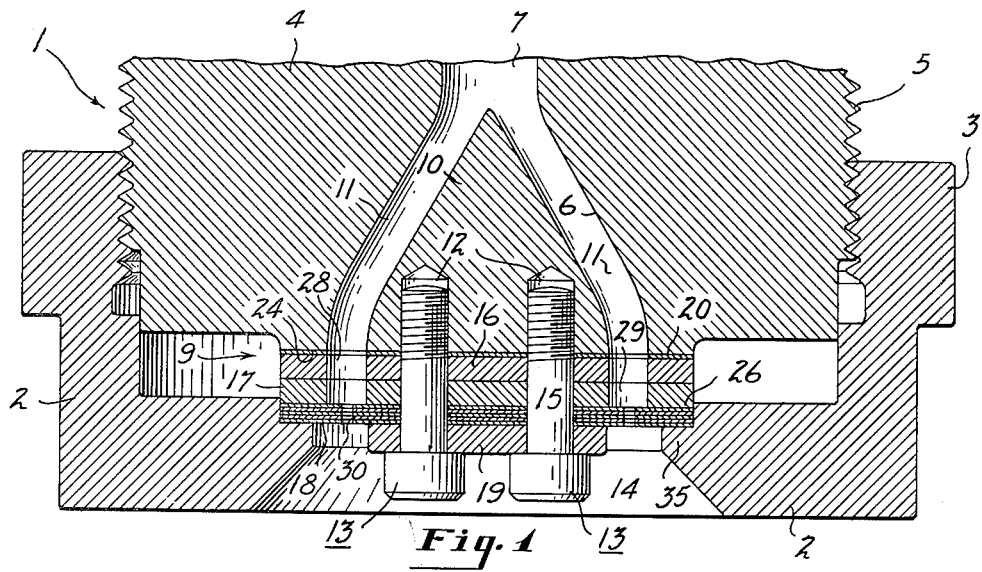
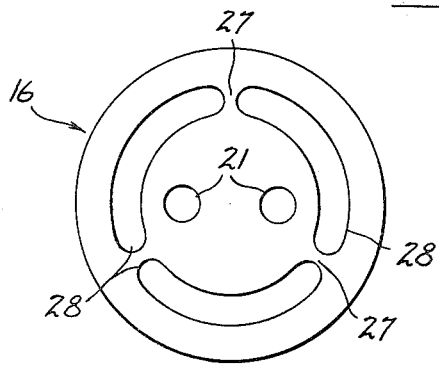
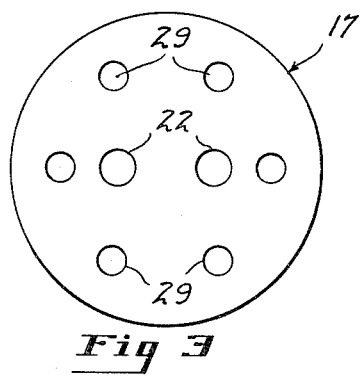
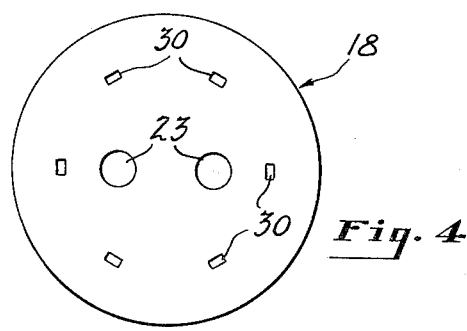
INVENTOR
*Romeo Gagne*
BY *McCoy, Greene + Te Grotenhuis*
ATTORNEYS

United States Patent Office 3,016,568
Patented Jan. 16, 1962

3,016,568
LAMINATED EXTRUDING DIE
Romeo Gagne, Pelham, N.H., assignor to The General Tire & Rubber Company, Akron, Ohio, a corporation of Ohio
Filed July 15, 1959, Ser. No. 827,370
3 Claims. (Cl. 18—8)

The present invention relates to dies for extruding threads or strips of plastic material and more particularly to an extruding die formed with a series of thin perforated sheets arranged in superposed relation.

Heretofore, the making of dies for extruding Saran and similar plastic materials involved grinding, machining and calibrating operations which required several days to complete. Several dollars' worth of Duranickel or other hard metal were required for the conventional dies, and the life expectancy of a conventional die for extruding Saran into threads with not substantially more than 200 production hours. After the dies had been worn so as to be rendered unsuitable, it was not possible to salvage any part of the dies. The wear on the dies was severe, particularly because of the necessity to insert a rod or wire through the orifices for cleaning whereby the orifices were worn and enlarged. When using the conventional dies to form monofilaments of Saran 909, for example, difficulty was experienced in obtaining more than 1 doff per die change.

It has been discovered that greatly improved results can be obtained from a laminated die having a series of thin perforated sheets and that an assembly can be readily provided for holding the sheets in position and for permitting quick removal and replacement of the sheets so that the cost of die maintenance is minimized and so that much better performance is obtained. The laminated sheets are extremely thin and preferably have a thickness of .004 to .020 inch so that the orifices can readily be formed by simple perforating operations. It is preferable to provide a removable die assembly comprising flat plates or holders on opposite sides of the laminated sheets, a guide cone or other tapered guide member, and removable screws for rigidly connecting the plates to the guide member. The extruding apparatus is constructed so that such die assembly may easily be removed and replaced. By using such a construction the only parts which can not be salvaged are the perforated sheets, and in some cases these sheets can be salvaged by perforating larger holes or additional holes. The new construction permits cutting of all of the orifices in the perforated sheet from the same punch and die so that all the extruding monofilaments have the same size, and the wear on the dies is minimized since it is possible to clean the perforated sheets by brushing the flat faces thereof without inserting a rod or wire through the orifices.

The production performance is improved by the laminated dies since it is possible to obtain more doffs per die change, and since the surface contact between the metal of the die and the plastic material in its amorphous state is minimized. Also, the provision of square corners in the inventory area traps carbon which in conventional dies tends to plug the die orifices with the result that more doffs per die change are obtained, there is less scrap, and the work load on the operator is reduced.

The laminated construction greatly reduces the cost of maintaining the dies and greatly reduces the downtime attributed to die changes. Where a conventional Duranickel die for extruding Saran monofilaments would require three dollars' worth of material, the corresponding size die made according to this invention would require less than one dollar's worth of material. The labor costs for replacing such conventional Saran dies would be very high since at least 3 days would be required to make new dies whereas less than 1 hour would be required to replace the laminated die of this invention. It is estimated that the cost of scrap for conventional dies would be in the neighborhood of 12% while the corresponding cost for sheet dies would be only 9%. It is also estimated that the cost of maintaining conventional dies would be around $1.00 per hour whereas a comparable laminated die would cost only a few cents per hour.

The laminated construction and the adjustable features of extruding apparatus of the type shown herein provide additional advantages. It is thus relatively easy to increase or decrease the number of orifices by replacing the laminated sheets, and the axial length of the die passages can be readily lengthened or shortened by using more or less sheets. The cross-sectional size of the orifices may also be changed in a relatively few hours whereas conventional dies would require several days' work to provide a die for any particular size monofilament.

An object of the present invention is to provide a die assembly which may be maintained at minimum cost.

A further object of the invention is to provide a die for producing a multiplicity of monofilaments of exactly the same size.

A still further object of the invention is to trap carbon formed during extruding of plastic material to increase the life of the die.

Another object of the invention is to provide a die assembly wherein the number or size of the die openings may be readily changed.

Other objects of the invention are to provide a simple and inexpensive die assembly and a die assembly which can readily be cleaned with minimum wear on the die orifices.

Other objects, uses and advantages of the present invention will become apparent to those skilled in the art from the accompanying description and claims and from the drawings in which:

FIGURE 1 is a fragmentary sectional view on an enlarged scale showing extruding apparatus constructed according to the present invention;

FIGURE 2 is a plan view of the slotted circular holder employed in the die assembly of FIG. 1 and on a smaller scale;

FIGURE 3 is a plan view similar to FIG. 2 showing the intermediate circular plate or holder of the die assembly of FIG. 1; and FIGURE 4 is a plan view similar to FIGS. 2 and 3 showing one of the perforated sheets in the laminated die assembly of FIG. 1.

Referring more particularly to the drawings, FIGURE 1 shows an extruding apparatus 1 comprising a removable annular cup-shaped cap 2, having an enlarged threaded portion 3 at its upper end, and an externally threaded block 4 having circumferential threads 5 which fit the internal threads of the portion 3. The central portion of the block 4 is removed to provide a smooth conical surface 4 which is coaxial with a supply passage 7. Saran (produced by the Dow Chemical Company), or other plastic material is forced through the supply passage 7 in the conventional manner to the extruding dies.

A die assembly 9 is mounted coaxial with the surface 6 and the passage 7 and includes a tapered guide member or cone 10 which preferably has generally the same shape as the surface 6 so as to provide a diverging circumferential passage 11 shaped generally as shown in FIG. 1. The cone 10 has internally threaded holes 12 for receiving a pair of screws 13, each screw having a head 14 and a threaded cylindrical portion 15 of smaller diameter that fits the threads of the hole 12. The assembly 9 also include a flat, slotted, circular plate or holder 16, a flat circular intermediate plate or holder 17, a laminated die in the form of a series of thin, flat, circular perforated sheets 18, and a flat circular plate or washer 19. If desired, a copper screen 20 or other suitable gasket may also be provided, but this is not essential. The members 16, 17 and 18 have the same external diameter, but the member 19 has a much smaller diameter as indicated in FIG. 1. The members 16, 17 and 18 have pairs of circular holes 21, 22 and 23, respectively, which are axially aligned with the holes 12 and have an internal diameter substantially equal to the external diameter of the screw portions 15.

It will be noted that the die assembly 9 can be clamped between the members 2 and 4 of the extruding apparatus by tightening the cap 2 with a wrench or other suitable tool and that such assembly may easily be removed by unscrewing the cap 2. The member 4 has a flat bottom surface 24 perpendicular to the axis of the cone 10 for engaging the marginal portion of the holder 16 throughout the circumference thereof, and the member 3 has an annular inwardly projecting flange 35 which provides an annular groove 26 for receiving the marginal portions of the perforated sheets 18. The groove 26 has a flat surface for engaging the bottom sheet 18 throughout its circumference and has a cylindrical surface of a diameter substantially equal to the external diameter of the sheets 18 so as to accurately locate the die assembly 9 coaxial with the surface 6. The members 16, 17 and 18 are, therefore, clamped together not only by the screws 13 but also by the members 2 and 4 so that the die assembly can withstand the high forces exerted during extrusion by the high pressure which necessarily is used. The groove 26 and the screws 13 accurately locate the parts 16, 17 and 18 in coaxial positions and prevent radial alignment of these members when the cap 2 is tightened properly as indicated in FIG. 1.

The circular holder 16 is provided with a series of arcuate slots 28 which extend throughout almost the entire circumference of the passage 11 and which are aligned axially with said passage. The width of the slots 28 may be the same as that of the passage 11 as indicated in FIG. 1 so that the plastic material flows readily through the holder 16.

The intermediate circular plate or holder 17 may have the same diameter and thickness as the member 16 but it is preferably provided with a series of circular holes or apertures 29 aligned with the orifices 30 of the sheets 18. The holes 29 and the orifices 30 are preferably axially aligned and may be arranged in regularly spaced relation as indicated in FIGS. 3 and 4. These openings are aligned with the open portions of the slots 28 so that the plastic will readily flow to the orifices 30. The holes 29 may have a diameter corresponding to the width of the slots 28 and may be axially aligned with such slots as indicated in FIG. 1 but it will be understood that the construction may vary considerably.

The orifices 30 of the sheets 18 are preferably formed by the punch and die of a conventional perforating machine and may conveniently be performed by single punch and die in an apparatus having means for indexing the sheet accurately. With such apparatus, it is possible to perforate all of the sheets 18 and to form all of the apertures 30 with the same punch and die so that all of the orifices 30 will be of exactly the same size and so that each orifice is accurately aligned with the orifice of the adjacent sheet 18. The orifices 30 are much smaller than the holes 29, but it is preferred to form the slots 28, the holes 29 and the orifices 30 with cylindrical surfaces generated by moving a straight line perpendicular to a plane so that square corners are provided as indicated in FIG. 1, which is drawn to scale (except as to the thickness of each sheet 18). With this construction, a shelf is provided in the inventory area 29 to trap the carbon which would otherwise be deposited on the die apertures of the plates 18. This arrangement increases the number of doffs per die change and greatly reduces the cost of the extruding operation.

The cross-sectional area of each hole 29 is preferably 2 to 10 times the cross-sectional area of each orifice 30 so as to provide an effective trap for the carbon. Each sheet 18 preferably has a thickness of .004 to .020 inch so as to function in the most efficient manner, and it is preferred to employ at least 4 and preferably 5 to 10 sheets 18 in each die assembly 9. The sheets 18 of the die assembly preferably have a combined thickness of about .04 to .10 inch. The sheets 18 are made of an extremely hard metal such as Duranickel or the like, and the parts 16, 17 and 19 are usually made of a similar material. The washer 19 has an external diameter no greater than the distance between diametrically opposed orifices 20 and preferably not substantially greater than the maximum diameter of the cone 10. The metal portions 27 between the slots 28 are small and are located out of alignment with the holes 29. It will be understood, however, that the size and arrangement of the parts may be varied considerably without losing all of the advantages of this invention.

When the extruding apparatus is employed to form threads or monofilaments, the laminated sheets preferably have axially aligned orifices 30 of the same size with a diameter or cross-sectional dimension of about .01 to .20 inch. Such orifices may have a square, elliptical or circular cross-section, but best results are obtained when they have a substantially rectangular cross section as shown herein.

In assembling the extruding apparatus of the present invention, five or more sheets 18 are clamped in axially aligned relation and spot welded together. The screws 13 are then inserted through the holes of the washer 19 and through the corresponding holes of the laminated sheets 18. The holders 17 and 16 are then slid over the screws 13 and threaded end portions of the screws are inserted into the holes 12 of the cone 10. The screws 13 are then tightened to clamp all of the parts of the die assembly 9 rigidly together. The assembly 9 is then placed in the groove 26 of the cap 2, and the cap is moved to a position coaxial with the threaded portion of the block 4 so that the cone 10 fits within the surface 6 of said block. The cap is then screwed onto the block to clamp the marginal portions of the die assembly 9 as indicated in FIG. 1. Saran 909 or other suitable plastic material is then forced through the passage 7 under high pressure and toward the die assembly 9. The plastic flows through the slots 28 and the holes 29 to the orifices 30. The plastic then flows out of the orifices as monofilaments of exactly the same size.

If it is desired to remove the die assembly 9 for cleaning or replacement of worn sheets 18, the cap 2 is unscrewed to permit removal of the die assembly 9, and the screws 13 are unscrewed from cone 10 to release the sheets 18. If the sheets are to be cleaned they are separated and the flat faces thereof are brushed to effect the cleaning, it being unnecessary to insert any cleaning tool through the orifices 30. The sheets 30 may thereafter be spot welded and reassembled as before. It will be apparent that there will be little wear on the parts 16 and 17 and that these parts need not be replaced when the sheets 18 are worn out. It will also be apparent that the sheets 18 can be salvaged by providing a new sheet adjacent the holder 17 which blocks off the worn out orifices 30 and by cutting new orifices in the new sheet 18 and in the old sheets 18. The sheets may also be salvaged by cutting larger orifices. However, the major advantages of this invention are obtained by replacing the sheets 18 since it is unnecessary to replace any other parts of the die assembly.

It will be understood that the above description is by way of illustration rather than limitation and that, in accordance with the provisions of the patent laws, variations and modifications of the specific apparatus disclosed herein may be made without departing from the spirit of the invention.

Having described my invention, I claim:

1. An extruding apparatus comprising a rigid block having an externally threaded generally cylindrical portion with a flat outer end and a tapered central recess at said outer end, a tapered guide member within said recess and spaced from said block to form a distributing passage which diverges toward the end of said threaded portion, a main supply passage in said block communicating with said distributing passage, a first plate engaging the outer end of said block around said recess, a second plate parallel to and engaging said first plate, and a series of thin metal sheets with a uniform thickness which is a small fraction of the thickness of each plate arranged in contacting superposed relation to form a laminated die stack having passages therein for extruding plastic monofilaments, an annular cap detachably connected to said block and having a surface engaging said stack around the periphery thereof to clamp the marginal portions of said sheets and said plate together, a third plate engaging the outer surface of said stack and located at the center of said cap, and means extending through said sheets and said plates for detachably connecting said third plate to said guide member and for clamping the central portions of said sheets and said plates together, said first and second plates having openings therein to permit flow of plastic through said passages, said first plate having arcuate slots therein aligned with said passages and said second plate having generally cylindrical apertures aligned with the passages of said laminated stack, said apertures having a cross-sectional area several times the cross-sectional area of each die passage at the entrance to said passage, whereby a carbon-collecting shelf is provided.

2. An extruding apparatus comprising a rigid block having a flat outer end and a tapered recess at said outer end, a tapered guide member within said recess and spaced from said block to form a distributing passage which diverges toward the outer end of said block, a main supply passage in said block communicating with said distributing passage, a plate engaging the outer end of said block around said recess and having a thickness of at least .05 inch, at least four thin metal sheets of uniform thickness arranged in contacting superposed relation to form a laminated die stack, said stack having a thickness of no more than .1 inch, said sheets having aligned orifices therein providing a plurality of axially unobstructed passages with a maximum cross sectional dimension of .01 to .2 inch for extruding plastic monofilaments, the marginal edges of the orifices of each passage being located in axial alignment, a removable cap detachably connected to said block and having a surface engaging said stack around the periphery thereof to clamp the marginal portions of said sheets and said plate together, another plate engaging the outer surface of said stack and located at the center of said cap, and screw means extending through said sheets and said plates for detachably connecting the other plate to said guide member and for clamping the central portions of said sheets and said plates together, said first-named plate having apertures aligned with the passages of said laminated stack, each of said apertures having a cross-sectional area at said stack which is several times the cross-sectional area of each die passage at the entrance to said passage, whereby a carbon-collecting shelf is provided.

3. An extruding apparatus comprising a rigid block having a flat outer end and a tapered central recess at said outer end, a removable tapered guide member within said recess and spaced from said block to form a distributing passage which diverges toward the outer end of said block, a main supply passage communicating with said distributing passage, a plate with a thickness of at least .05 inch engaging the outer end of said block around said recess, a series of metal sheets with a uniform thickness of about .004 to .02 inch arranged in contacting superposed relation to form a laminated die stack having axially unobstructed passages therein for extruding plastic monofilaments, said sheets having orifices therein defining said passages, the marginal edges of the orifices being in axial alignment, an annular cap and a central plate for clamping said sheets together while permitting flow through said passages, said cap being detachably connected to said block and engaging said stack around the periphery thereof to clamp the marginal portions of said sheets and said plate together, said last-named plate engaging the outer surface of said stack inwardly of said passages near the center of said cap, and screw means extending through said sheets and said plates for detachably connecting said guide member to said last-named plate and for clamping the central portions of said sheets and said plates together, said first-named plate having generally cylindrical apertures aligned with the passages of said laminated stack, said apertures having a cross-sectional area several times the cross-sectional area of each die passage at the entrance to said passage, whereby a carbon-collecting shelf is provided.

References Cited in the file of this patent

UNITED STATES PATENTS

| | | |
|---|---|---|
| 1,252,821 | Lewis | Jan. 8, 1918 |
| 1,492,594 | Dreyfus et al. | May 6, 1924 |
| 1,964,659 | Brumberger | June 26, 1934 |
| 2,031,387 | Schwarz | Feb. 18, 1936 |
| 2,848,737 | Poetter et al. | Aug. 26, 1958 |
| 2,923,970 | Genovese | Feb. 9, 1960 |